United States Patent
Hardwick

[15] 3,695,134
[45] Oct. 3, 1972

[54] DEVICES FOR CUTTING FABRIC
[72] Inventor: Albert R. Hardwick, Leicester, England
[73] Assignee: USM Corporation, Flemington, N.J.
[22] Filed: Nov. 3, 1970
[21] Appl. No.: 86,435

[30] Foreign Application Priority Data
Nov. 5, 1969    Great Britain..........54,158/69

[52] U.S. Cl. ..........................83/451, 83/531, 83/655
[51] Int. Cl. .............................................B26d 7/02
[58] Field of Search.........83/451, 652, 655, 531, 901

[56] References Cited

UNITED STATES PATENTS

| | | | |
|---|---|---|---|
| 2,768,686 | 10/1956 | Feiertag | ...................83/451 X |
| 2,222,256 | 11/1940 | Deutscher | ...................83/451 |
| 2,690,219 | 9/1954 | Feiertag | ...................83/451 X |
| 289,594 | 12/1883 | Zieger | .........................83/451 |

*Primary Examiner*—Donald G. Kelly
*Attorney*—W. Bigelow Hall, Richard A. Wise and Richard B. Megley

[57] ABSTRACT

A device for cutting fabric has a pinning frame placed on a support of a press having a head relatively movable toward and away from the support. The frame has an aperture adjacent the support and receives a plate having an aperture in register with the frame aperture. A plurality of pins project from the plate near its aperture to hold fabric on the plate. A die is then forced through the fabric and both apertures by relative movement of the head toward the support to cut the material against the support of the press.

4 Claims, 4 Drawing Figures

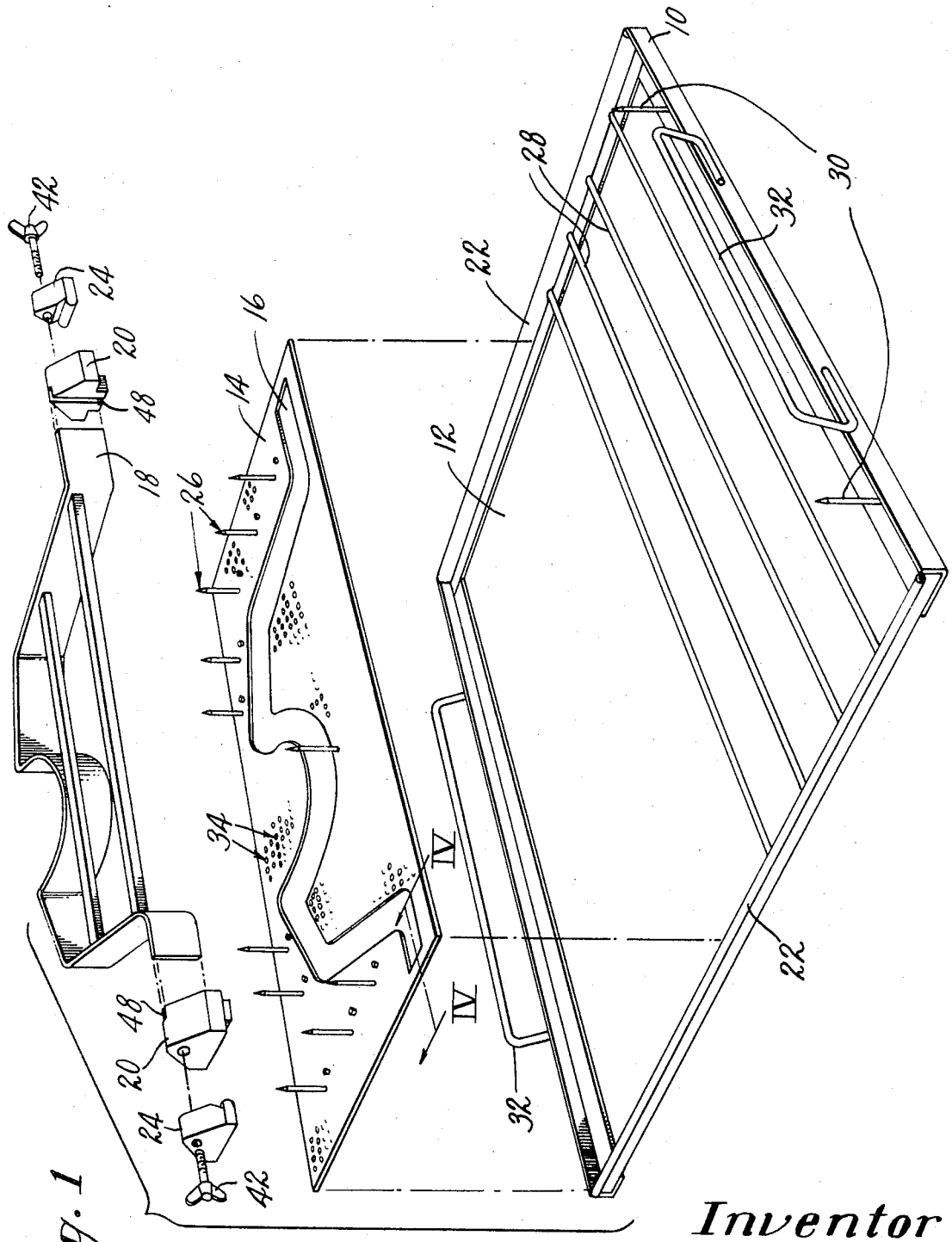

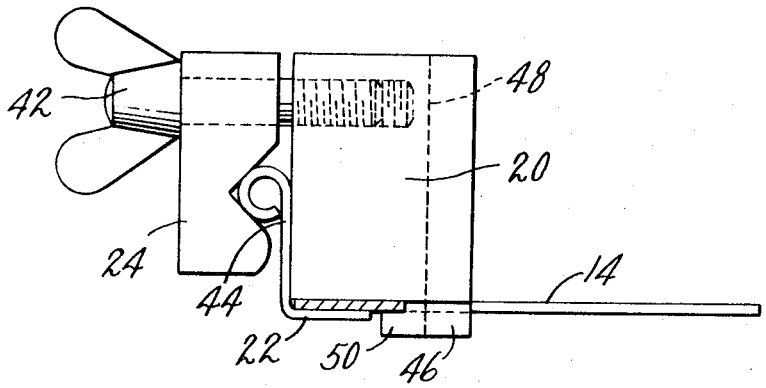
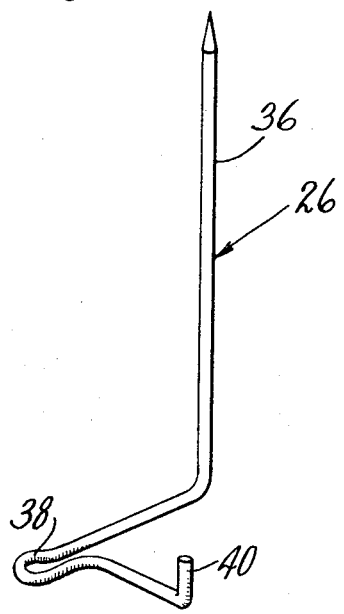
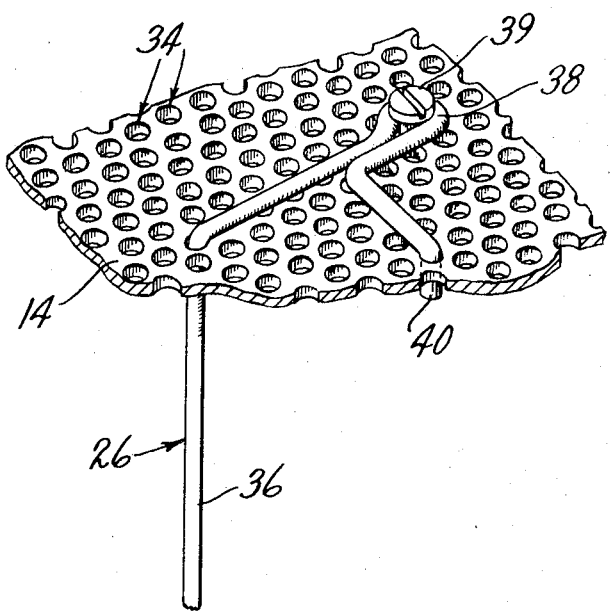

DEVICES FOR CUTTING FABRIC

BACKGROUND OF THE INVENTION

This invention relates to an improved device for use in die cutting of fabric. It has long been known that a die could be forced through a layer of fabric placed on a support of a press by relative movement of the support and a head of the press toward each other. Such die cutting of a single layer of material is not economically practical where the pattern or texture of the fabric requires that the die be accurately located relative to the fabric. The time required to accurately locate the die makes such cutting too slow, and thus too costly, to be practical.

Therefore, it is common practice to orient several layers of fabric in a single fabric lay and to cut each layer of the lay with a single cutting stroke of the press in which the head forces the die through the entire lay. To cut such a lay it is necessary to hold each layer of fabric in the desired orientation. Holding fabric which stretches in the plane of the fabric sheet is difficult. Additionally, some fabrics, for example those made from bulked yarn, are compressible in a direction normal to the plane of the fabric sheet. Compression of the fabric along a narrow die cutting line deforms the material and results in additional stretching of the fabric. Stretching moves the fabric from the desired orientation. Many knitted fabrics are particularly subject to both stretching and compression resulting in such extensive movement of the layers of a lay that die cutting of such fabrics has not been practical.

To overcome this problem it has been proposed to use a support for the fabric having a plurality of pins on which the layers of fabric are impaled to hold each layer in the desired orientation. This proposal is not successful because the support holding the pins also provides a cutting surface against which the die cuts the fabric. The support is thus necessarily made from a hard material such as steel which is impractically heavy. In addition, the die must be located relative to the fabric while the support is on the press. Such location of the die continues to be a time consuming and thus costly operation. Therefore, die cut knitted fabrics, which have particular advantage in tailored clothing, continue to command a premium price.

SUMMARY OF THE INVENTION

Accordingly, it is an object of the invention to provide a light-weight device for holding a lay of fabric during die cutting in which the die may also be quickly located relative to the fabric.

To this end, a device has a pinning frame adapted to be placed on the support of a cutting press. The frame has an aperture adjacent the support for receiving a plate having an aperture in register with the frame aperture. A plurality of pins project from the plate near the plate aperture to impalingly hold each layer of a fabric lay on the plate in a desired orientation. Guides are mounted on the device to locate a die relative to the fabric orientation. The device holding a lay of fabric is placed on the support of a cutting press and a die quickly located relative the fabric by the guides. Relative movement toward each other of the support and a head of the press then forces the die through the fabric lay and through the apertures in the plate and frame to cut the fabric against the support of the press. Fast and accurate die cutting of a fabric lay is thus possible. Because the die passes through the plate and frame to cut the material against the support, the plate and frame of the device may be made of light weight material.

BRIEF DESCRIPTION OF THE DRAWING

For purposes of illustration, and not as a limitation, the invention will now be described with reference to the drawings, wherein:

FIG. 1 is an exploded perspective view of the device;

FIG. 2 is a perspective view of a pin shown in FIG. 1;

FIG. 3 is a perspective view of part of the underside of a plate and a pin shown in FIG. 1; and FIG. 4 is a side of a guide shown in FIG. 1.

DESCRIPTION OF THE PREFERRED EMBODIMENT

As shown in FIG. 1, a rectangular frame 10 has angled edge members defining an aperture 12 in the broad surface of the frame. A plate 14 is supported by the frame at the aperture. An aperture 16 in the plate registers with the aperture 12 in the frame. The plate aperture is shaped similarly to a die 18 for receiving the die when it is forced through a lay of fabric (not shown) on the device by a press (not shown). Guides 20 locate the die for passing through the plate aperture 16 and are adjustably secured to sides 22 of the frame by clamps 24. Pins indicated generally at 26 project from the plate near its aperture 16 to hold each layer of a lay of fabric in the desired orientation. The device with a lay of fabric on the plate is then placed on a support of the press, the die located above the fabric by the guides 20, and a head of the press moved toward the support to force the die through the fabric and the plate and frame apertures to cut the fabric against the support of the press.

The frame 10 comprises angled edge members supporting slats 28 across a portion of its aperture 12 for supporting the fabric lay adjacent the plate 14. Plate 14 may thus be made smaller than the frame and the weight of the device kept to a minimum. The slats 28 are removable from the frame to accommodate plates of varying sizes. Pins 30 project from the frame to hold the fabric lay at the edge of the frame. The frame additionally has handles 32 to facilitate moving the device into and out of the press. The frame is of such size that the pins 30 and the handles 32 are laterally spaced from the head of the press so that they are not crushed by the head during a cutting stroke.

The plate 14 is perforated as indicated generally at 34 to make the plate light weight and for receiving the pins 26. As shown in FIG. 2, the pins each comprise an elongated pointed shaft 36 on which the fabric lay is impaled. The shaft 36 is inserted from the underside of the plate through any desired perforation 34. A base portion of the pin has a loop section 38 through which a fastening 39 is inserted into another perforation of the plate. The fastening may be a force screw, rivet, or the like. The pin additionally has a stump 40 parallel to and laterally spaced from the shaft 36. The stump is inserted through another perforation of the plate to hold the pin with the shaft 36 normal to the plane of the plate 14.

A pin 26 properly inserted through the plate 14 is shown in FIG. 3. The shaft 36 is shorter than the height of the die to be used to cut the fabric lay. The pin will thus not be crushed by the head of the press when the head forces the die through the lay to cut the fabric against the support of the press.

As shown in FIG. 4, the guide 20 is secured to the clamp 24 by a threaded fastener 42. A raised portion 44 of the side 22 of the frame 10 is interposed between the clamp and guide. The guide 20 has a foot 46 which projects through the aperture 16 of the plate. The foot 46 additionally has a projection 50 which engages the underside of the plate to grip the plate between the foot and the guide. The guide is located on the frame in the desired position by inserting the foot 46 in the aperture 16 and engaging the projection with the plate. The guide is then secured to the frame by tightening the fastener 42 to grip the raised portion 44 of the frame between the clamp 24 and the guide 20. Securing the guide to the frame also secures the plate to the frame because of the engagement of the guide and the plate. The guide has a slot 48 for receiving an end of the die 18. When the guide is located on the frame, the slot 48 locates the die so that it will pass through the plate aperture 16 when forced through the fabric lay by the press. The die may thus be quickly located on the device relative to the fabric which itself is arranged on the plate in the desired orientation for the cut.

Having thus described my invention, what I claim as new and desire to secure by Letters Patent of the United States is:

1. A device for holding a lay of fabric to be cut with a press, which device comprises:
    a frame having edge members defining an aperture;
    a plate supported by the frame and having an aperture in register with the frame aperture;
    a plurality of pins projecting from the plate near its aperture for impalingly holding fabric placed on the plate;
    a guide adjacent the plate aperture; and
    a die located on the device by the guide for cutting the fabric when forced through the fabric and the plate and frame apertures by the press.

2. A device as in claim 1, wherein additional pins project from the frame in spaced, parallel arrangement with those from the plate for impalingly holding the fabric to the frame.

3. A device as in claim 1 and additionally comprising a clamp and means adjustably connecting the clamp with the guide to engage the frame between the clamp and guide for adjustably securing the guide to the frame.

4. A device as in claim 3 wherein the guide has a foot with a projection for securing the plate to the frame.

* * * * *